(12) United States Patent
Petersen et al.

(10) Patent No.: US 10,328,873 B2
(45) Date of Patent: Jun. 25, 2019

(54) METHOD AND APPARATUS FOR SCHEDULING VEHICLE STARTUP

(71) Applicant: Ford Global Technologies, LLC, Dearborn, MI (US)

(72) Inventors: Brian Petersen, Beverly Hills, MI (US); Joseph Paul Rork, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 858 days.

(21) Appl. No.: 14/277,145

(22) Filed: May 14, 2014

(65) Prior Publication Data
US 2015/0330318 A1 Nov. 19, 2015

(51) Int. Cl.
| | |
|---|---|
| B60R 16/023 | (2006.01) |
| F02D 29/02 | (2006.01) |
| B60H 1/00 | (2006.01) |
| G06Q 10/00 | (2012.01) |
| G07C 5/00 | (2006.01) |
| G07C 5/08 | (2006.01) |

(52) U.S. Cl.
CPC ....... *B60R 16/023* (2013.01); *B60H 1/00657* (2013.01); *B60H 1/00778* (2013.01); *F02D 29/02* (2013.01); *G06Q 10/00* (2013.01); *G07C 5/008* (2013.01); *G07C 5/0841* (2013.01); *F02N 2300/20* (2013.01)

(58) Field of Classification Search
CPC .... B60W 10/06; Y02T 10/48; F02N 11/0818; F02N 11/0814; F02N 2300/20; G06Q 10/00; G07C 5/008; G07C 5/0841; B60R 16/023; F02D 29/02; B60H 1/00657; B60H 1/00778

See application file for complete search history.

(56) References Cited

U.S. PATENT DOCUMENTS

| | | | |
|---|---|---|---|
| 5,894,912 A | 4/1999 | Dobben | |
| 6,028,372 A * | 2/2000 | West | F02N 11/0807 123/179.2 |
| 6,351,703 B1 * | 2/2002 | Avery, Jr. | B60R 25/04 123/179.2 |
| 7,542,827 B2 * | 6/2009 | Gerard | F02N 11/0811 340/425.5 |
| 8,489,085 B2 * | 7/2013 | Simmons | B60R 25/00 455/420 |
| 8,543,318 B2 | 9/2013 | Ma et al. | |
| 9,104,537 B1 * | 8/2015 | Penilla | G06F 17/00 |
| 2011/0256904 A1 | 10/2011 | Simmons | |

(Continued)

*Primary Examiner* — Sizo B Vilakazi
(74) *Attorney, Agent, or Firm* — Frank Lollo; Brooks Kushman PC

(57) ABSTRACT

A computer implemented method includes logging vehicle startup information. The method also includes determining, via a computer, if timing commonalities exist between logged vehicle startup information instances. Further, the method includes recommending automatic vehicle startup, based on a threshold number of timing commonalities. The method also includes formulating recommended start times based on logged vehicle startup information instances having timing commonalities. The method additionally includes presenting a schedule including recommended start times to a vehicle user and scheduling automatic vehicle startups upon vehicle user acceptance of the presented schedule.

5 Claims, 5 Drawing Sheets

(56) References Cited

U.S. PATENT DOCUMENTS

| | | |
|---|---|---|
| 2013/0310515 A1 | 12/2012 | Kirshon et al. |
| 2013/0231848 A1 | 9/2013 | Roberts et al. |
| 2013/0265178 A1* | 10/2013 | Tengler .................. H04W 4/00 340/989 |
| 2013/0268144 A1 | 10/2013 | Du et al. |
| 2015/0304406 A1* | 10/2015 | Penilla .................. G01C 21/26 709/203 |

* cited by examiner

METHOD AND APPARATUS FOR SCHEDULING VEHICLE STARTUP

TECHNICAL FIELD

The illustrative embodiments generally relate to a method and apparatus for scheduling vehicle startup.

BACKGROUND

Many vehicles come equipped with remote start capabilities. In these vehicles, the user will engage a feature on a key fob and a vehicle will respond by engaging the engine. Some remote start features may include automatically setting a vehicle temperature and engaging certain vehicle climate features. Automatic locking of vehicle doors may also be provided, so that a started vehicle cannot be driven away. While convenient, users may forget to start the vehicle on certain mornings, even if starting the vehicle remotely is typically part of a morning routine.

U.S. Pat. No. 7,542,827 generally relates to a method for scheduling the remote starting of an engine of a vehicle. The vehicle includes a remote starting device and a controller coupled to a communication device and to the remote starting device. The remote starting device is responsive to commands from the controller. The method includes a first step of defining a schedule of starting times. A next step includes entering the schedule in the controller. A next step includes controlling an operation of the remote starting device in accordance with the schedule.

U.S. Pat. No. 8,489,085 generally relates to a system and method for a vehicle remote starter with an advanced dynamic scheduling system. The system and method utilizes a cellular telephone, interfacing with standard scheduling software, and capable of communicating with the Internet to gather real time data and communicating through a wireless telecommunication network with a vehicle to send vehicle remote start and other commands; an electronic scheduling system utilized within or accessible by the cellular telephone; a cellular telephone based and/or vehicle based GPS location module for determining the location of the vehicle and the cellular telephone at any particular point in time; a set of coded instructions that actively queries the Internet for real time data and that queries the electronic scheduling system to determine the time and location of a scheduled meeting, evaluating various vehicle operational parameters, the distance of the cellular phone from a vehicle, various environmental parameters, the distance from a vehicle to meeting location, the travel time required to timely travel and attend the scheduled meeting, and either prompting the user to actively send a remote start command signal to the vehicle or automatically sending the remote start command signal.

SUMMARY

In a first illustrative embodiment, a computer implemented method includes logging vehicle startup information. The method also includes determining, via a computer, if timing commonalities exist between logged vehicle startup information instances. Further, the method includes recommending automatic vehicle startup, based on a threshold number of timing commonalities. The method also includes formulating recommended start times based on logged vehicle startup information instances having timing commonalities. The method additionally includes presenting a schedule including recommended start times to a vehicle user and scheduling automatic vehicle startups upon vehicle user acceptance of the presented schedule.

In a second illustrative embodiment, a computer implemented method includes logging vehicle startup information. The method also includes determining, via a computer, if timing commonalities exist between logged vehicle startup information instances. The method further includes recommending automatic vehicle startup, based on a threshold number of timing commonalities. The method further includes formulating recommended start times based on logged vehicle startup information instances having timing commonalities. Also, the method includes presenting a schedule including recommended start times to a vehicle user and scheduling automatic vehicle startups upon vehicle user acceptance of the presented schedule.

In a third illustrative embodiment, a system includes a processor configured to log vehicle start times. The processor is also configured to determine if timing variances over a timing threshold exist between logged vehicle startup times and scheduled start times. Further, the processor is configured to recommend a change to the scheduled start times, based on a threshold number of timing variances over the timing threshold. The processor is also configured to formulating new recommended start times based on logged vehicle startup information instances having timing commonalities. The processor is additionally configured to present a new schedule including new recommended start times to a vehicle user and rescheduling automatic vehicle startups upon vehicle user acceptance of the new schedule.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
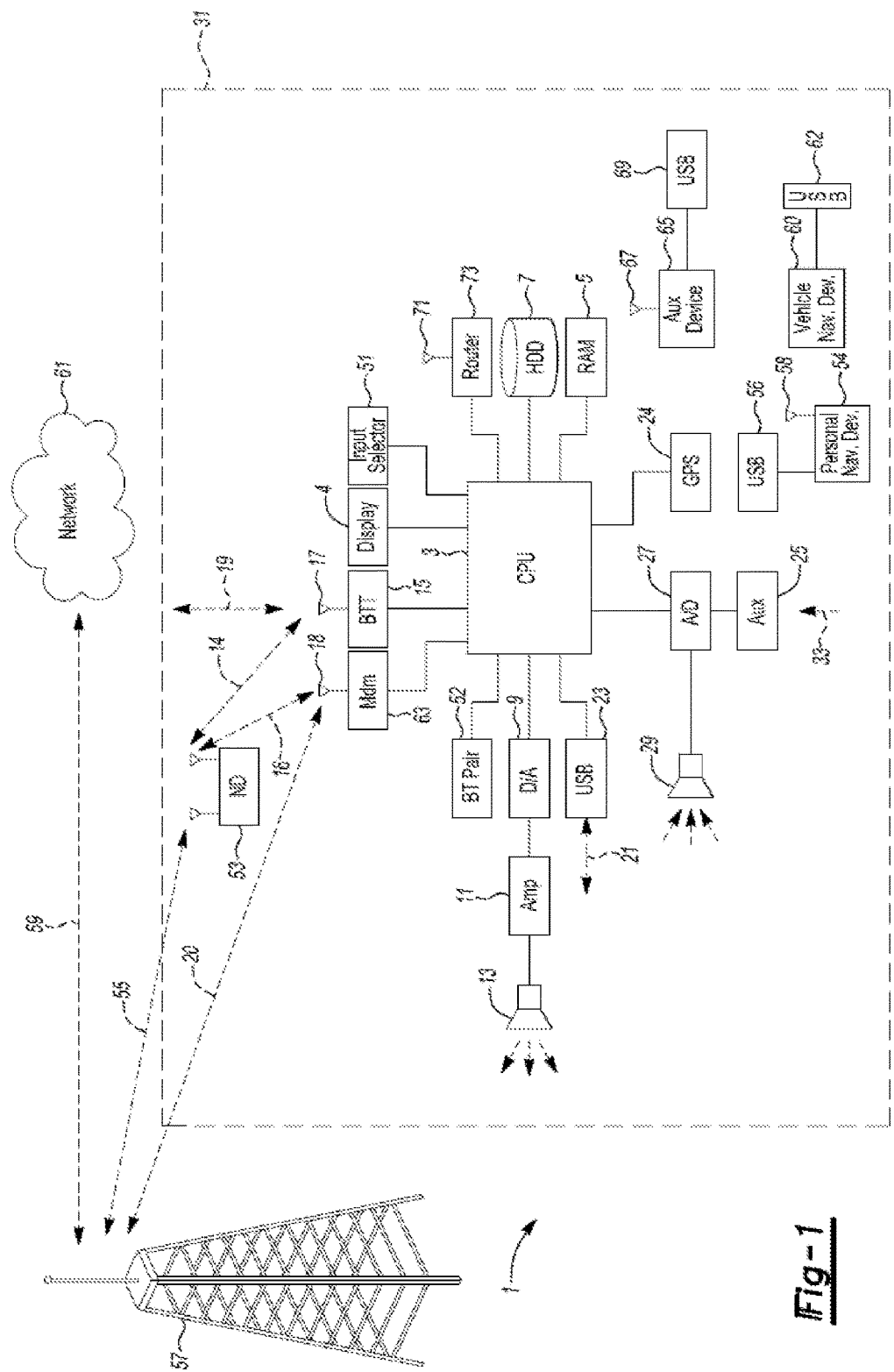
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61.

As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

The illustrative embodiments contemplate that a system for scheduling a remote start to a vehicle already exists. As can be seen from the prior art, several extra-vehicular devices can be programmed to communicate with a vehicle to schedule remote starting. Other examples of possible remote start scheduling include schedules stored within a vehicle memory itself, or storing a schedule on the cloud and communicated to the vehicle.

These schedules are typically set by a user. If Jim knows that he will need to use his vehicle, Monday through Friday, at six AM, then he may use a web or vehicle interface to create a schedule that starts the vehicle at 5:50 AM on the specified days. Unfortunately, Jim may not know that such a feature exists on his vehicle, and, accordingly, may instead use a remote start option every day at 5:50 AM.

In the illustrative embodiments, it is proposed that a system will "notice" when a vehicle is started and, based on a certain number of common start events at a common time, the process will recommend to a user, through a vehicle interface for example, that a schedule be established. This will both notify the user of the existence of the feature and, at the same time, provide the user with a schedule based on common remote start times.

Also, in the illustrative embodiments, a system may notice a change in start up times, if the user is starting the vehicle at times other than typically scheduled. Further, the process will check existing schedules and may suggest modifications to these schedules if appropriate, based on observed user usage of the vehicle.

Figure 2:
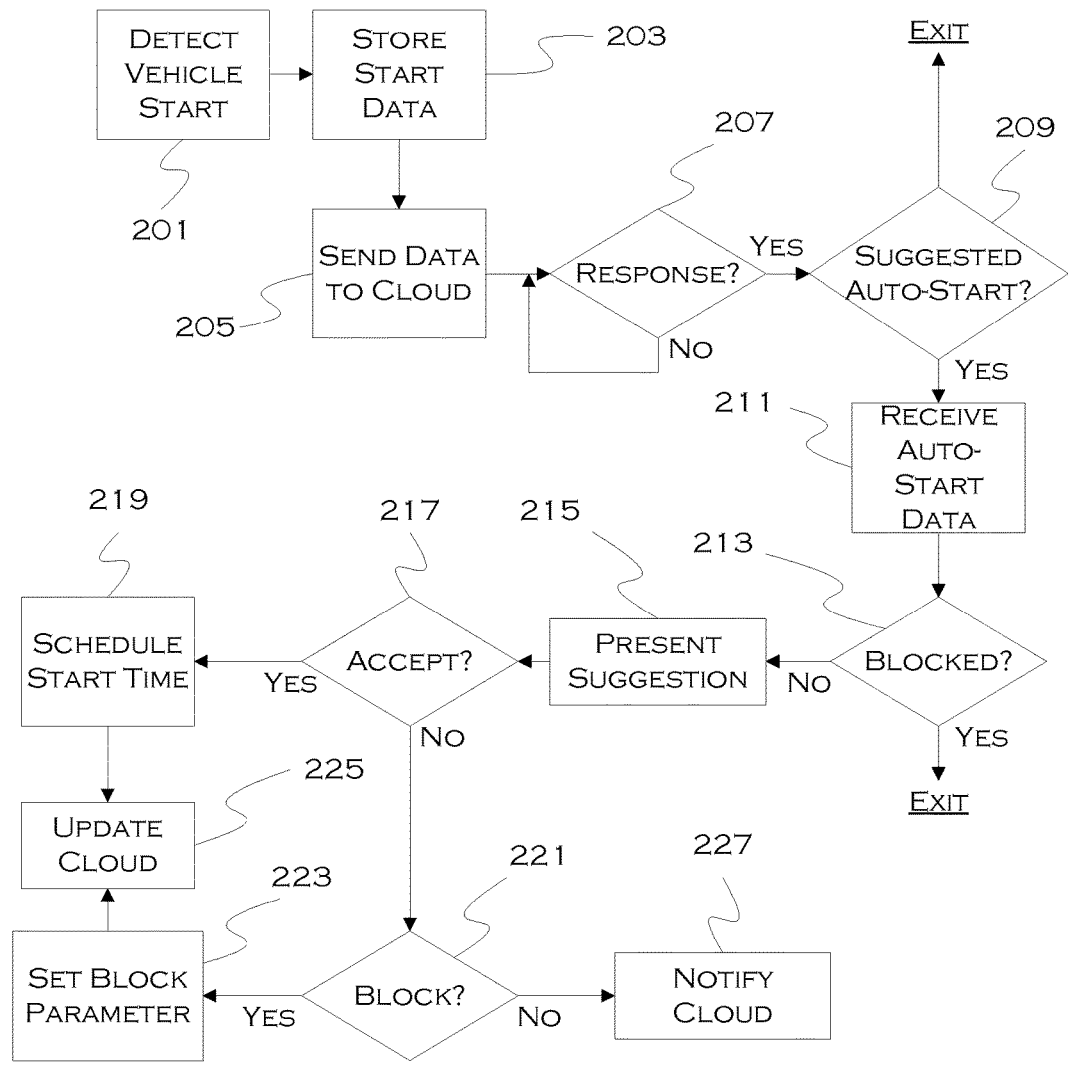
FIG. 2 shows an illustrative vehicle-side process for recommending scheduling a vehicle start.

FIG. 2 shows an illustrative vehicle-side process for recommending scheduling a vehicle start. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process transfers start data to the cloud, for analysis on the cloud. In other examples, however, the cloud-based processes can be run on the vehicle directly, and analysis and recommendations can be generated within the vehicle computing system itself.

As shown in FIG. 2, the process is initiated when a vehicle startup is detected 201. This can be a start using a vehicle system, or it can be a start using a remote start feature. Once the start data has been detected, the process stores the start data in a local storage 203. This data can be used by the vehicle directly, if the analysis process is performed onboard, or the data can be sent to the cloud for analysis 205.

In this process, the local system sends the data to the cloud for analysis 205. The system then waits for a response from the remote system 207. While the process spools, waiting for a response, it is possible that the process may time-out if too much time passes. If a response is received 207, the process may also receive notification that an auto-start schedule is suggested 209. If no such indication is received, the process may exit.

If the process receives notification that the auto-start is suggested, the process may receive data relating to the scheduling of an auto-start 211. This data may include, but is not limited to, recommended start times and recommended days of the week for the corresponding start times.

The process checks to see if the user has blocked scheduling recommendations 213. If the recommendations have been blocked, the process exits. If the recommendations have not been blocked, the process may present a suggestion to the user that the auto start feature be engaged 215. This presentation can be made, for example, via a vehicle interface, or could, for example, be made on a user device working in conjunction with a vehicle-related application. Any suitable means of presenting the recommendation may be used.

If the user accepts the recommended start schedule 217, the process can schedule a start time 219. In this example, the start time is scheduled in the vehicle and a low level of power may be utilized to maintain a clock, which can be used to trigger the startup. In another example, the start time may be scheduled remotely, and a low level of power can be used to keep a communication device active, which can communicate with the remote server to receive start up instructions.

Once the schedule has been updated on the vehicle, the process may also update the cloud with the new schedule 225, so that the cloud can track current vehicle schedules. If the user does not accept the recommended schedule, the user may also be provided with an option to block the recommendation process 221. If the process is not blocked, the system may notify the cloud that there was no block and that no schedule was accepted 227. If the process was blocked, a block parameter 223 may be set locally, and the cloud may also be updated with the block parameter. In this example, the local process checks for the block, but in another example the cloud may check for the block before performing any analysis or recommendation processing on the vehicle data (since it is not necessary, if the recommendations are blocked anyhow).

Figure 3:
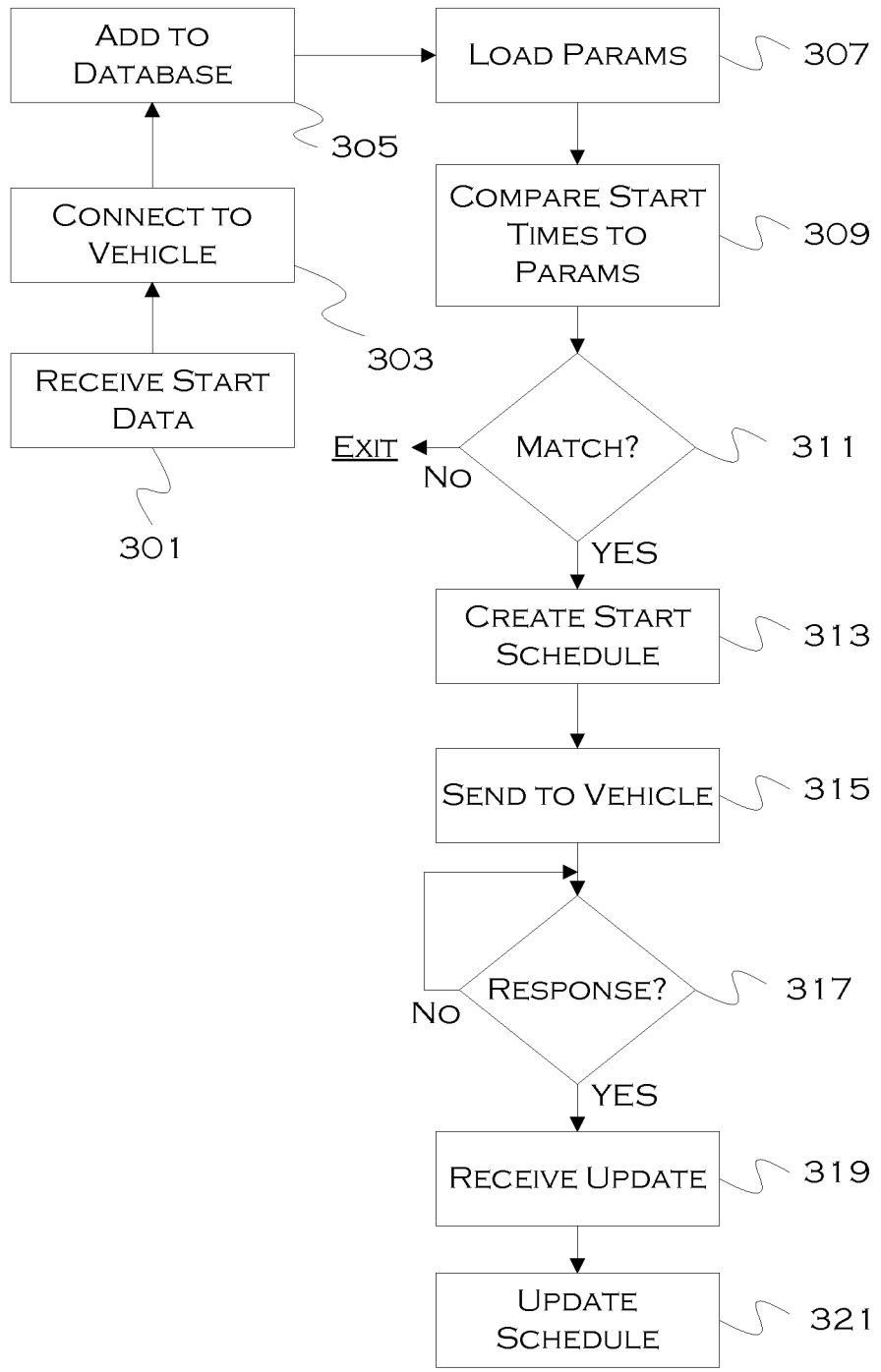
FIG. 3 shows an illustrative server-side process for recommending scheduling a vehicle start.

FIG. 3 shows an illustrative server-side process for recommending scheduling a vehicle start. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the remote server, residing in the cloud, connects to a particular vehicle 301. The remote server will receive, for example, startup data from the vehicle 303. This data can be added to a remote database of records designated for the particular vehicle 305. In addition to the startup data, the process may also receive vehicle identifying information that allows the remote server to identify the vehicle to which the records correspond.

The remote process may also load schedule setting parameters 307. These parameters may be set by an individual user, or they may be set by an original equipment manufacturer (OEM). By allowing the OEM to set parameters, even users who do not even know of the existence of the system can benefit from the processes described herein, without having to set the vehicle parameters first.

The parameters can specify, among other things, a threshold number of times that a startup should be observed before a recommendation is made. In another example, the parameters may specify a threshold variance between startup times, over which all times will be considered to be the "same" time. This could be set at, for example, 10 minutes, so that all startups within 10 minutes of each other are considered as a basis for a recommendation. The parameters could also specify how the exact start time is determined, for example, by taking a mean or median time from the observed start times. Any other suitable parameters may be used as appropriate for observing start times and providing recommendations.

The observed start times can be compared to the loaded parameters 309 to determine if a match that meets the set criteria has been established 311. If an appropriate match is established, the process may create a start schedule for the user based on the criteria 313. The start schedule can be based on some or all of the observed start times and/or actual times of vehicle use. For example, if a vehicle is started between 5:40 and 5:55 every day, and is used at 6:00 every day, the process can base the start time on the common usage time, as opposed to the varied startup times. In other instances, the start times may be based on the actual startup times.

The start schedule as established, may be sent to the vehicle 315 for presentation to the user and adaption by the vehicle system. The process may then wait for a response from the vehicle 317. As with the wait in the vehicle, the process may timeout if no response is received. On the other hand, if a response is received, the process also receive an update, including, for example, the schedule, from the vehicle 319. The process may also then update remote storage with the received information 321, allowing the remote storage to track the schedule set for the vehicle.

Figure 4:
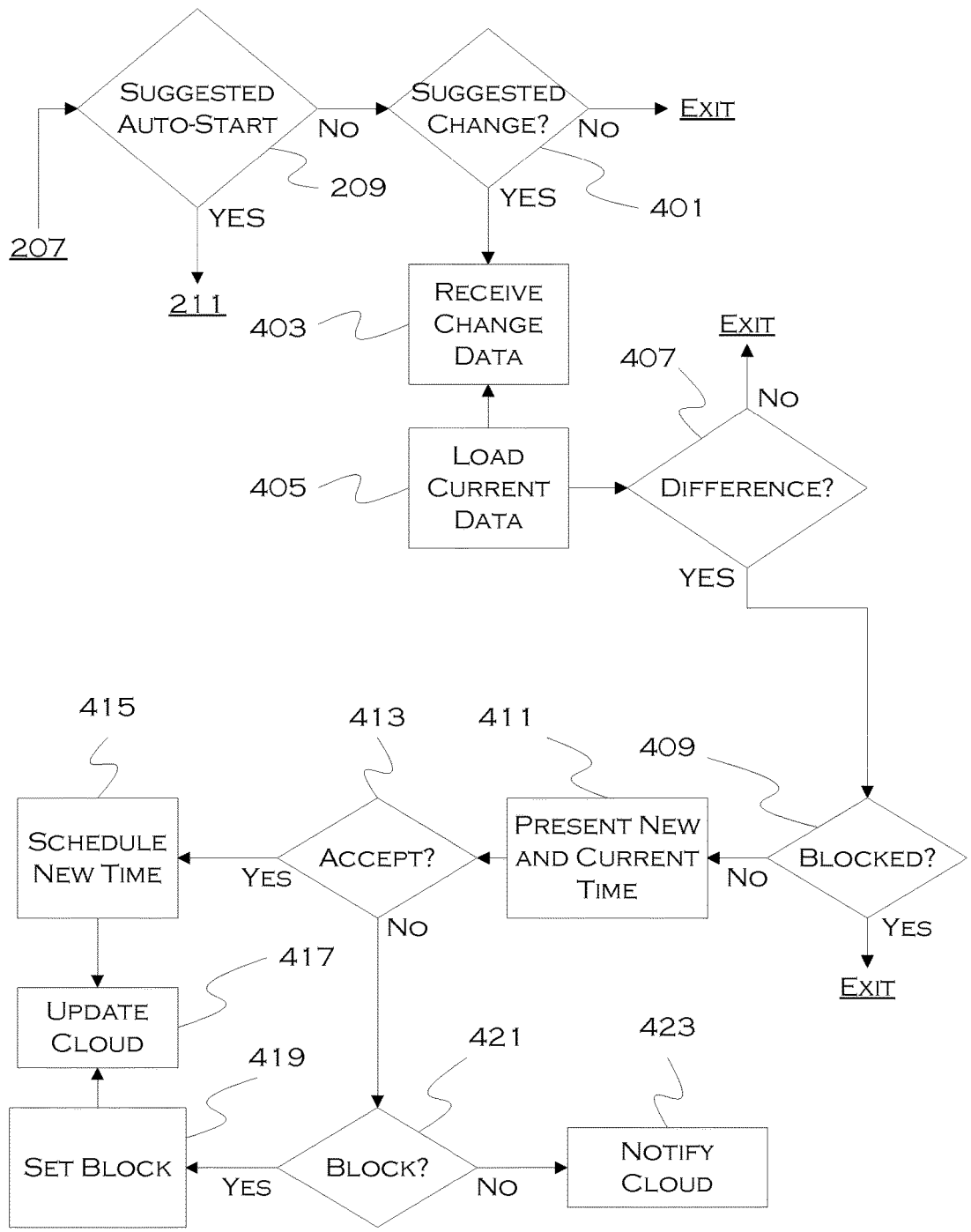
FIG. 4 shows an illustrative vehicle-side process for recommending changing a schedule.

FIG. 4 shows an illustrative vehicle-side process for recommending changing a schedule. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process will provide a suggested adjustment to an already set schedule. Changes in a user's time schedule may result in observed vehicle usage that varies from the usage on which the startup schedule was based. These changes may result in a recommended schedule that changes to the new schedule based on the varied new schedule.

In this example, after vehicle start data has been sent to the remote server, the process on the vehicle may determine if a change is recommended 209. If the change is not recommended, the process may also determine if a change in schedule is recommended. If the schedule had already been set, and the current usages deviated from the recommended schedule as set, the process may resultantly recommend a change to a current schedule 401.

If so, the process may receive the recoemneded changes to the current schedule from the remote server 403. As with the previous process, any and all determinations may also be made by a local process as opposed to on the remote server.

Once the changed schedule has been received, the process may load a current schedule set on the vehicle 405. This may be done so that the new schedule can be compared to the local schedule on the vehicle to determine if the user, for example, has already set the new schedule on the vehicle and the remote server simply did not know about the vehicle. As long as there is a difference in the schedules 407, the process may proceed, otherwise the process may exit. As with before, the process may check to see if the user has blocked changes to the schedule 409. If the user has blocked changes, the process may exit.

If the change suggestion is not blocked, the process may present new suggested start times and current start times (if desired) 411. By presenting both new and current start times, the process can show the user what the current schedule is, and what the new schedule will be. If the user accepts the changes 413, the process can set a new schedule on the vehicle 415. If the user rejects the schedule 413, the process can provide an option to block the schedule.

If the user opts to block the schedule 421, the process can set a block parameter 419. In either event, the server can be updated with the changes selected by the user 417. Even if the schedule is not selected and if the block is not set, the server can still be set with the parameters unchanged 423.

Figure 5:
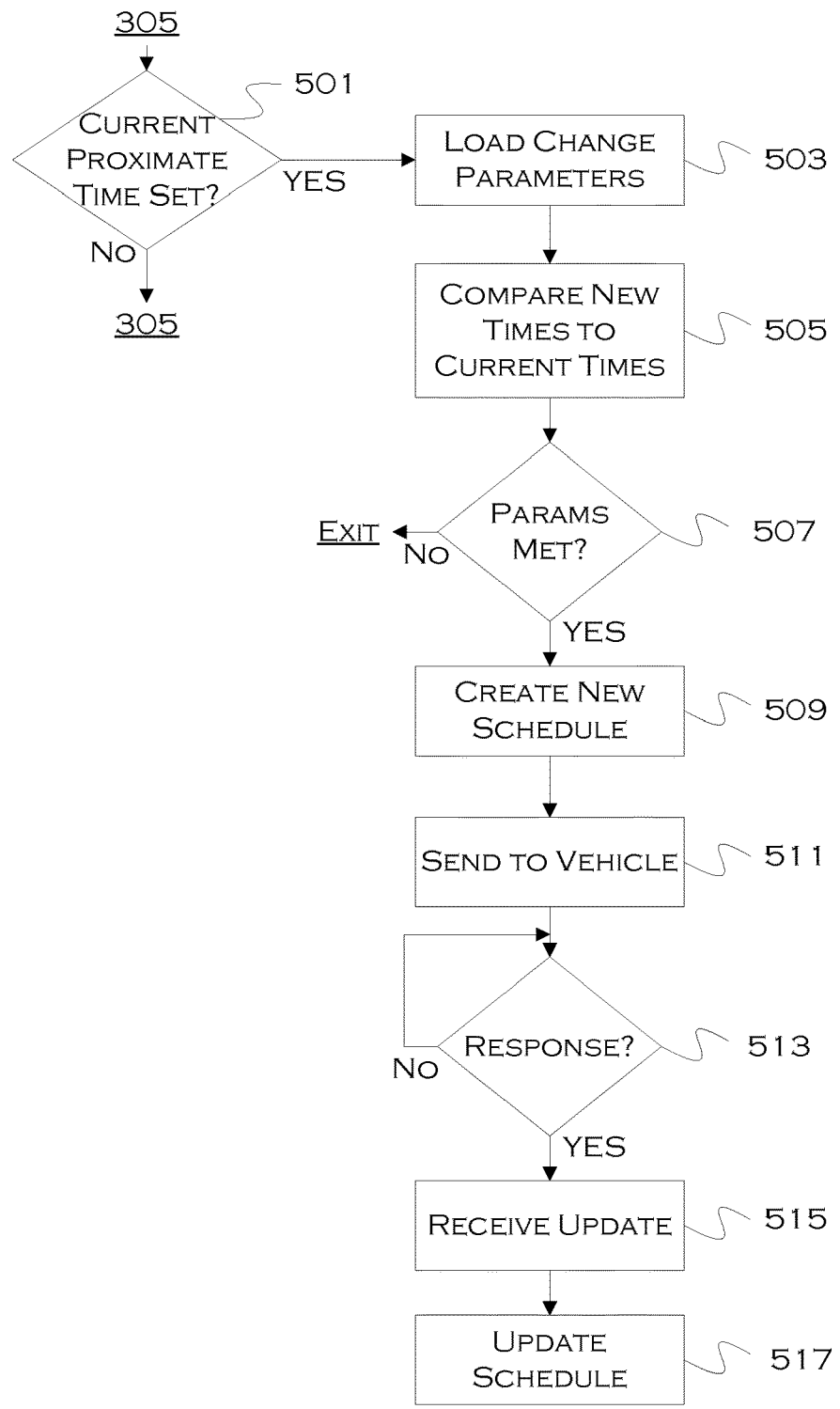
FIG. 5 shows an illustrative server-side process for recommending changing a schedule.

FIG. 5 shows an illustrative server-side process for recommending changing a schedule. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the remote process will also determine if a change to a current schedule should be implemented. After receiving the start up data from the vehicle, the process checks to see if a time proximate to the current startup time is set 501. The proximate definition here, may be, for example, 45 minutes to an hour, representing a wide latitude in possible schedule changes. Since, in this example, a proximate time set will result in a check for a change in schedule, the proximate time definition may be broad.

In other examples, other checks can be made in lieu of this check, such as a check to see if the vehicle was actually used at an anticipated time (and this startup is just ancillary to the normal startup). Other suitable checks may also be made, to determine if a schedule already exists and whether or not the schedule comports with the actual observed usages.

If the current usage appears to be a deviation from the planned usage, based on the suitable tests, the process may load parameters for usage to check for suitable data to change a schedule. These parameters can define variances such as, but not limited to, variances in predicted and actual usage times, variances in days of usage, and number of times a variance should be observed before a change should be made.

The newly observed and different times can be compared to the currently predicted times 505 to see if the parameters for a change are met 507. If the parameters are met, the process can create a new schedule 509. The new schedule, which can be an amendment of the current schedule, is then sent to the vehicle 511.

The process then waits for a response from the vehicle 513. If the response is not received from the vehicle, the process can continue to wait. Otherwise, the process receives a response from the vehicle and receives any updates that are sent by the vehicle 515. The updates sent by the vehicle can then be used to update a remote schedule in accordance with the received updates.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a processor configured to:
    log vehicle start times;
    determine if timing commonalities exist between logged vehicle start time instances;
    based on a threshold number of timing commonalities, within a user-defined deviance, recommend automatic start;
    formulate recommended start times based on logged start time instances having timing commonalities;
    present a schedule including recommended start times; and
    schedule automatic vehicle startups upon vehicle user acceptance of the presented schedule.

2. The system of claim 1, wherein the commonalities are defined by parameters including at least a threshold number of timing commonalities.

3. The system of claim 1, wherein the processor is configured to instruct presentation of the schedule via a vehicle interface.

4. The system of claim 1, wherein the startup time includes remote start time.

5. A system comprising:
    a processor configured to:
    log vehicle start times;
    determine if timing variances greater than a user-defined timing threshold exist between logged start times and scheduled start times;
    based on a user-defined threshold number of variances greater than the threshold, formulate new recommended start times based on logged vehicle startup information;
    present a new schedule including new recommended start times; and
    reschedule automatic vehicle startups upon vehicle user acceptance of the new schedule.

* * * * *